United States Patent

Borrill

[11] 4,050,733
[45] Sept. 27, 1977

[54] VEHICLE CAB
[75] Inventor: James L. Borrill, Doncaster, England
[73] Assignee: International Harvester Company, Chicago, Ill.
[21] Appl. No.: 651,984
[22] Filed: Jan. 23, 1976
[51] Int. Cl.² .......................................... B62D 27/04
[52] U.S. Cl. .............. 296/28 C; 180/89.12; 280/756; 296/35 R
[58] Field of Search ............. 296/28 C, 35 R, 102; 180/89 R, 89.1, 89.12; 280/756

[56] References Cited

U.S. PATENT DOCUMENTS

| 3,017,198 | 1/1962 | Horowitz | 296/102 |
| 3,578,377 | 5/1971 | Babbitt | 296/102 |
| 3,834,754 | 9/1974 | Zajichek | 296/35 R |
| 3,841,430 | 10/1974 | Babbitt | 296/28 C |
| 3,940,177 | 2/1976 | Miers | 296/28 C |
| B 443,647 | 2/1976 | Palmer | 296/28 C |

FOREIGN PATENT DOCUMENTS

| 1,170,240 | 11/1969 | United Kingdom | 296/35 R |

*Primary Examiner*—Joseph F. Peters, Jr.
*Assistant Examiner*—John A. Carroll
*Attorney, Agent, or Firm*—Raymond E. Parks; Floyd B. Harman

[57] ABSTRACT

The invention relates to a sub-frame, a support structure and a cab for a vehicle such as a crawler tractor. The sub-frame is mounted on the vehicle support structure by resilient mountings and a cab is mounted on the sub-frame. In this way, the cab is insulated from vibrations in the support structure.

10 Claims, 5 Drawing Figures

VEHICLE CAB

BACKGROUND OF THE INVENTION

The present invention relates to a sub-frame, a support structure and a cab for a vehicle, and is particularly concerned with, but not limited to, a motor vehicle, such as a crawler tractor.

FIELD OF THE INVENTION

In the operation of a motor vehicle, such as a crawler tractor, tractor engine generates noise and vibrations which travel through a considerable part of the vehicle including the driver's compartment. Obviously, these vibrations and this noise can cause fatigue and produce a consequent loss of concentration in the driver, and it is an aim of the invention to at least partially reduce the noise and vibration level in the driver's compartment.

SUMMARY OF THE INVENTION

According to one aspect of the present invention there is provided a sub-frame, a support structure and a cab for a vehicle, comprising first and second pairs of upright beams or sub-frame elements each having upper and lower ends, a first pair of lower longitudinally extending beams or sub-frame elements adapted to carry a floor, the lower longitudinally extending beams or sub-frame elements being connected to and extending between the lower ends of the first and second pairs of upright elements, a second pair of upper longitudinally extending beams or sub-frame elements mounted to the upper ends of the second pair of upright beams or sub-frame elements, a first crossbar connected to the upper ends of the first pair of upright beams or sub-frame elements, a second crossbar parallel to the first crossbar and connected to the extending ends of the upper pair of longitudinally extending beams or sub-frame elements and forming a seat support, and resilient mountings carried by the first and second crossbars, and sub-frame support means on the support structure adapted to couple said crossbars to the support structure of the vehicle and insulate the cab from vibrations in the support structure.

A cab framework which includes a roof and a or windshield may be detachably mounted on the sub-frame, and the operator's seat may be mounted upon a one-piece moulding of plastic material which is adapted to be carried by the upper longitudinally extending beams or sub-frame elements and by the second crossbar. The plastic moulding may also be supported at the front lower edge by an additional crossbar connected to the sub-frame.

According to another aspect of the present invention there is provided a vehicle including a support structure upon which the above described sub-frame for a cab is mounted by the resilient mountings.

The support structure may carry a roll-over protection structure, and one or more control columns may be rigidly attached to the support structure and project into the cab.

BRIEF DESCRIPTION OF THE DRAWING

The invention will now be particularly described by way of example with reference to the various figures of the accompanying drawing in which.

DESCRIPTION OF THE PREFERRED EMBODIMENT

Figure 1:
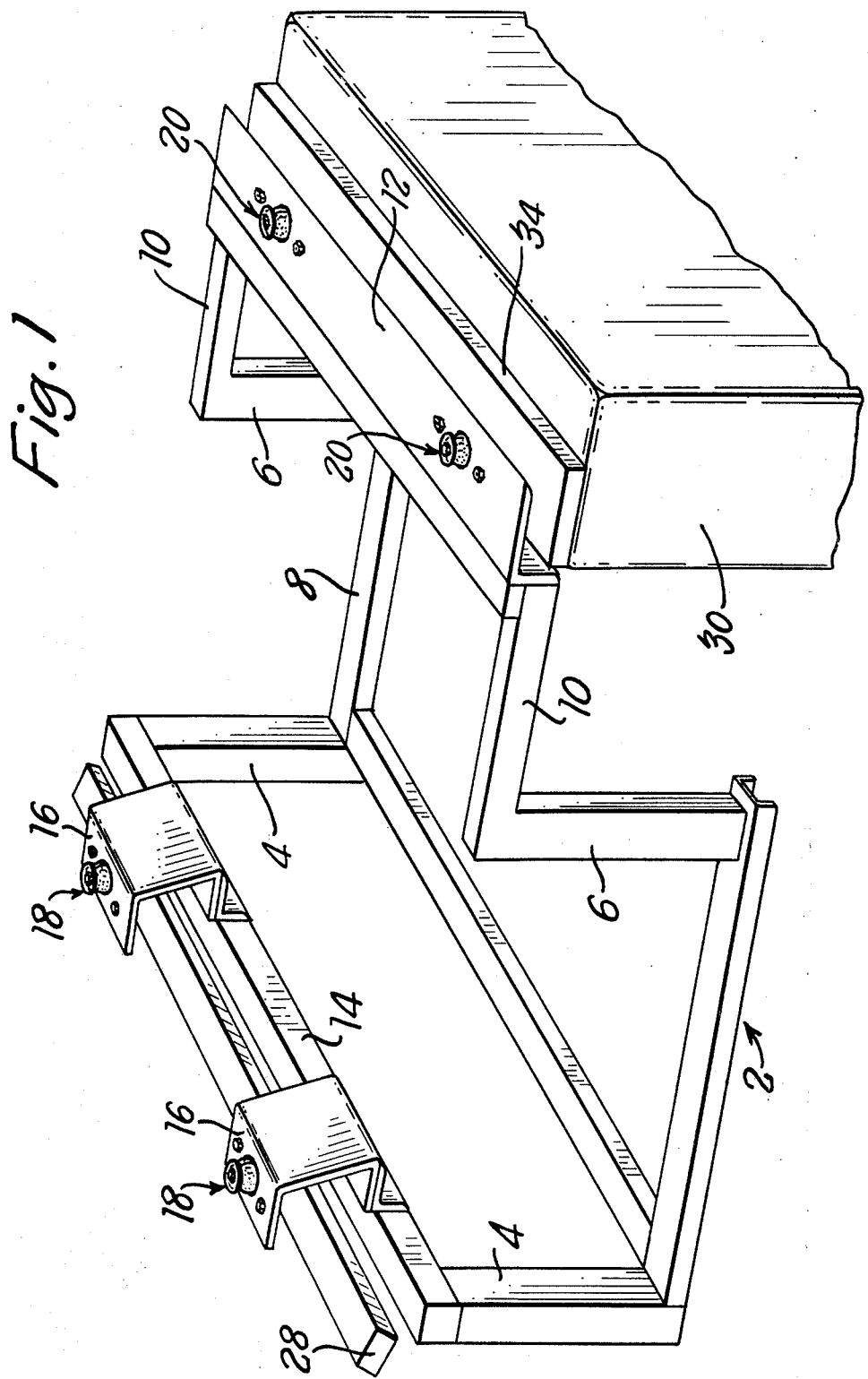
FIG. 1 is a perspective view of a sub-frame and a portion of the sub-frame supporting crossbeams carried on the support structure.

Referring to FIG. 1, a sub-frame for a cab is indicated generally at 2.

This sub-frame includes a front or first pair 4 and a rear or second pair 6 of vertical beams or sub-frame elements which are linked at their lower ends by a first pair of lower parallel longitudinally extending beams or sub-frame elements 8. A second pair of upper parallel longitudinally extending beams or sub-frame frame elements 10 are connected to and extend from the upper ends of the second pair of vertical beams or sub-frame elements 6. A second or an extending crossbar 12 is connected to the rear ends of the second pair of longitudinally extending beams 10. A first or a front crossbar 14 connects the upper ends of the front or first pair of vertical beams 4 and extends parallel to the second or rear crossbar 12. Two generally U-shaped brackets 16 are bolted or connected to the front crossbar 14 to extend upwardly and forwardly therefrom. Two forward resilient mountings 18 are connected one to each bracket 16, and two rearward resilient mountings 20 are connected to the rear crossbar 12.

Figure 3:
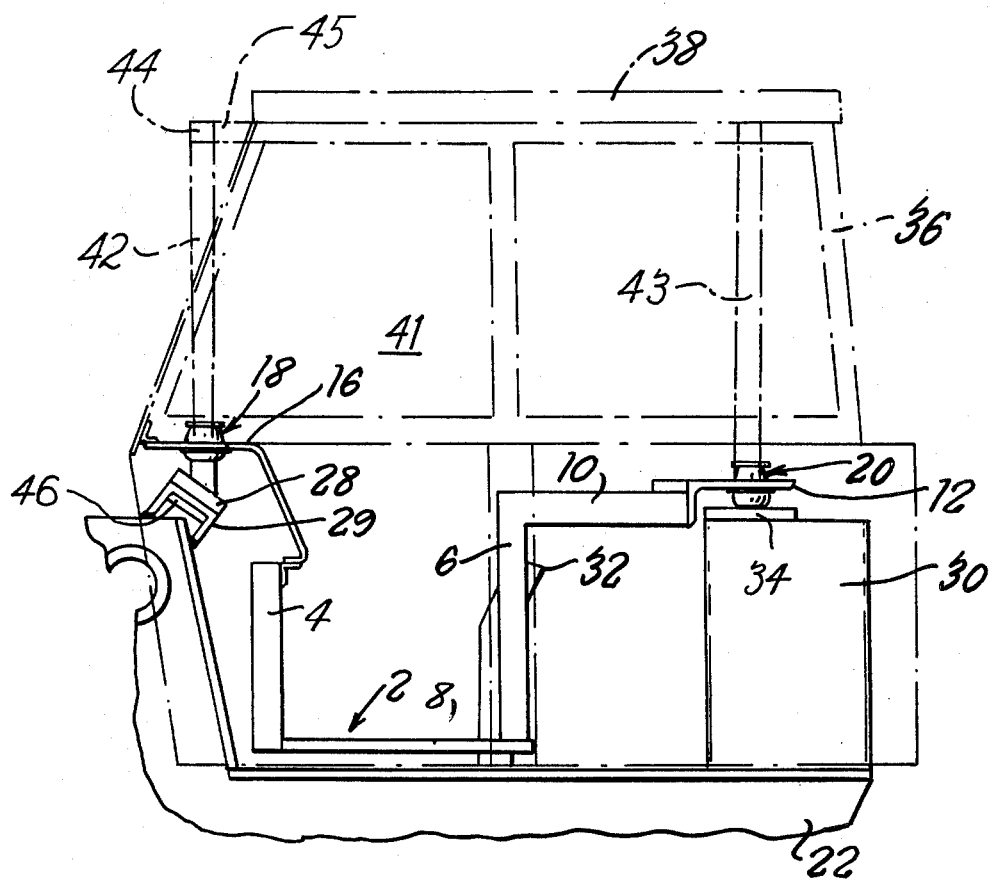
FIG. 3 is a side view of the sub-frame shown in FIG. 1 resiliently mounted to the support structure shown in FIG. 2 and includes a cab framework and a roll-over protection structure shown in a dash-dot outline.

The cab shown in dash-dot outline in FIG. 3 may include two lower cab-entry doors which are hinged to opposite sides of the sub-frame 2 to extend approximately waist high of the cab driver.

Figure 2:
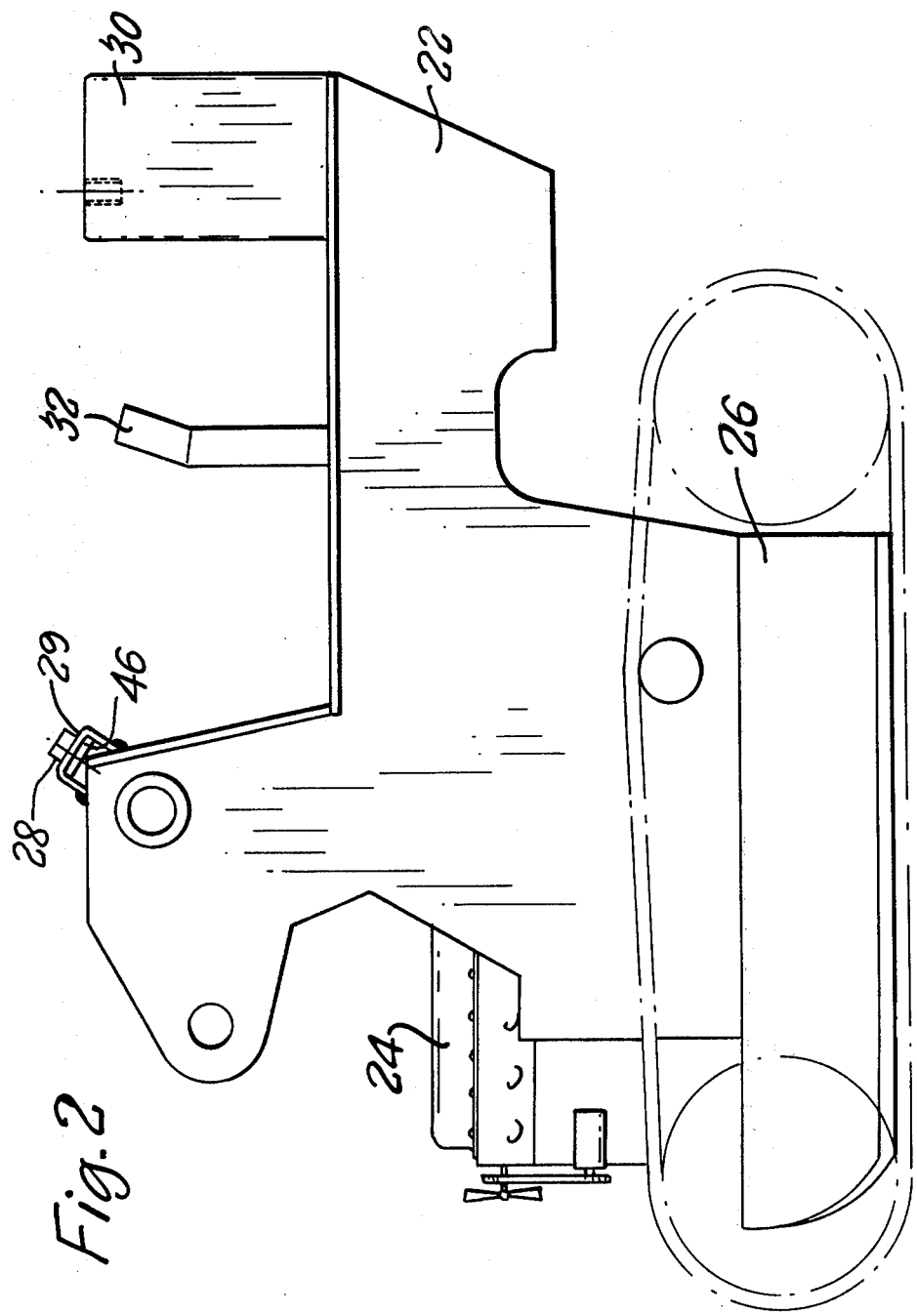
FIG. 2 is a diagrammatic side view of a crawler tractor type of vehicle showing an engine, a support structure and the sub-frame mounting and supporting means.

Referring to FIG. 2, there is shown a crawler tractor engine 24, and two transversely spaced crawler tractor housings 26. Two cross-bars (not shown) are bolted at opposite ends to these housings to extend between the housings, and a support structure 22 is mounted on these crossbars. A transversely extending elongate forward support member 28 is connected to a channel member 29 mounted on the forward part of the support structure 22, and a combined fuel and hydraulic tank 30 is mounted on the rearward part of the support structure.

Righthand and lefthand control columns 32 extend upwardly from the mid-portion of the support structure 22.

In another type of tractor (not shown), the support structure 22 may be omitted, and the frame 2 may be mounted on members which are supported from a drive transmission case (not shown) which is located at the rear of the engine 24.

Figure 5:
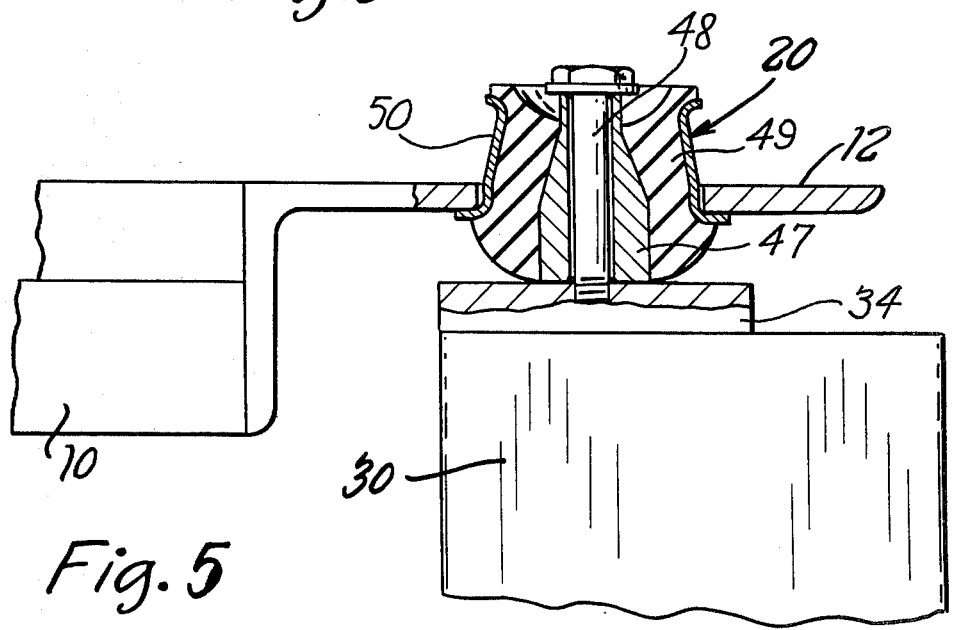
FIG. 5 which appears on the sheet with FIG. 3, is an enlarged side view, partly in section, illustrating the resilient mounting of the rear part of the sub-frame to the support structure.

Referring to FIGS. 1, 3 and 5, a rearward transversely extending elongate support member or crossbar is connected to the top of the tank 30. The front resilient mountings 18 (see FIG. 4) are connected to the forward support member or crossbar 28 and the rearward resilient mountings 20 (see FIG. 5) are connected to the rearward support member 34 so as effectively to suspend the sub-frame 2 on the tractor support structure 22.

Referring particularly to FIG. 3, a dash-dot outline of a cab superstructure is indicated generally at 36 which can be detachably mounted on the sub-frame 2; for example by being bolted to the rear crossbar 12, the upper longitudinal beam elements 10 and the brackets 16. This superstructure can conveniently include a roof 38, a windscreen or windshield 40 and two upper cab-entry doors 41 all shown in dash-dot outlines. These upper doors may be hinged to opposite sides of the superstructure 36 to combine with any hinged lower doors which may be provided on the sub-frame 2 to provide two cab doors each having an upper and a lower part. The cab doors may be designed to provide an attractive appearance with two hinged doors (not shown) of the tank 30. These tank doors may cover respective lateral sides of the tank 30; the righthand side door providing access to an hydraulic accumulator, water trap and control valve, and the left hand side door providing access to two batteries and to a steering/braking valve. The tank doors may be mounted on lift-off hinges and be latched by bonnet catches having release controls located inside the cab. The cab doors may be lockable thereby making both the cab and the tank 30 theft proof. Alternatively, the doors of the tank 30 may be locked by conventional key operated locks in the tank side doors.

The floor (not shown) of the cab may, is mounted on the lower longitudinal beam elements 8, and the operator's seat (not shown) may be mounted on a one-piece moulding of plastics material (not shown) which may be carried by the upper longitudinal beam elements 10 and the rear crossbar 12.

The control columns 32 extend upwardly through apertures which may be provided in the one-piece plastics moulding, and a flexible boot (not shown) may be provided to seal each control column to the edges of its respective aperture.

The lower part of the cab may be closed at the front by a panel (not shown) comprising a one-piece plastics moulding having apertures to receive the cab instruments. The connections from the instruments to various points on the tractor may all pass through a common disconnectable jackplug. A cab having the superstructure 36 and this front panel can be made completely enclosed thereby restricting the entry of air borne noise in to the cab.

If desired, a "roll-over protection structure" shown in dash-dot outline in FIG. 3, can be included. This structure consists effectively of four parallel upright metal members 42 and 43 located at the four corners of the cab. The front and rear pairs 42 and 43 of these upright members are secured at their lower ends to two crossbars of similar size and shape as the crossbars 28 and 34. The front crossbar is connected to the structure 22 via the channel member 29, and the rear crossbar is connected to the tank 30. The upper ends of the members are connected by four horizontal members 44 and 45 forming a rectangular frame located in the roof of the cab. If the tractor should turn over, this rigid structure protects the driver from being crushed by the weight of the tractor. This structure is not rigidly connected to the sub-frame 2 or any part of the cab so that vibrations passed to the structure from the support 22 are not transmitted to the cab. If desired, a protective roof can be built into the horizontal frame at the upper part of the support structure.

It is to be clearly understood that a tractor can have a roll-over protection structure even if the cab superstructure 36 is not fitted.

In FIGS. 2 and 3, a bar 46, welded inside the channel member 29, is intended to provide sufficient metal thickness to enable holes to be tapped of sufficient depth to receive bolts which fasten the support member 28 and upright rollover member 42 to the channel member 29. These bolt fastenings have to be sufficiently strong to withstand loads imposed on the rollover structure in the event that the tractor accidently overturns.

Figure 4:
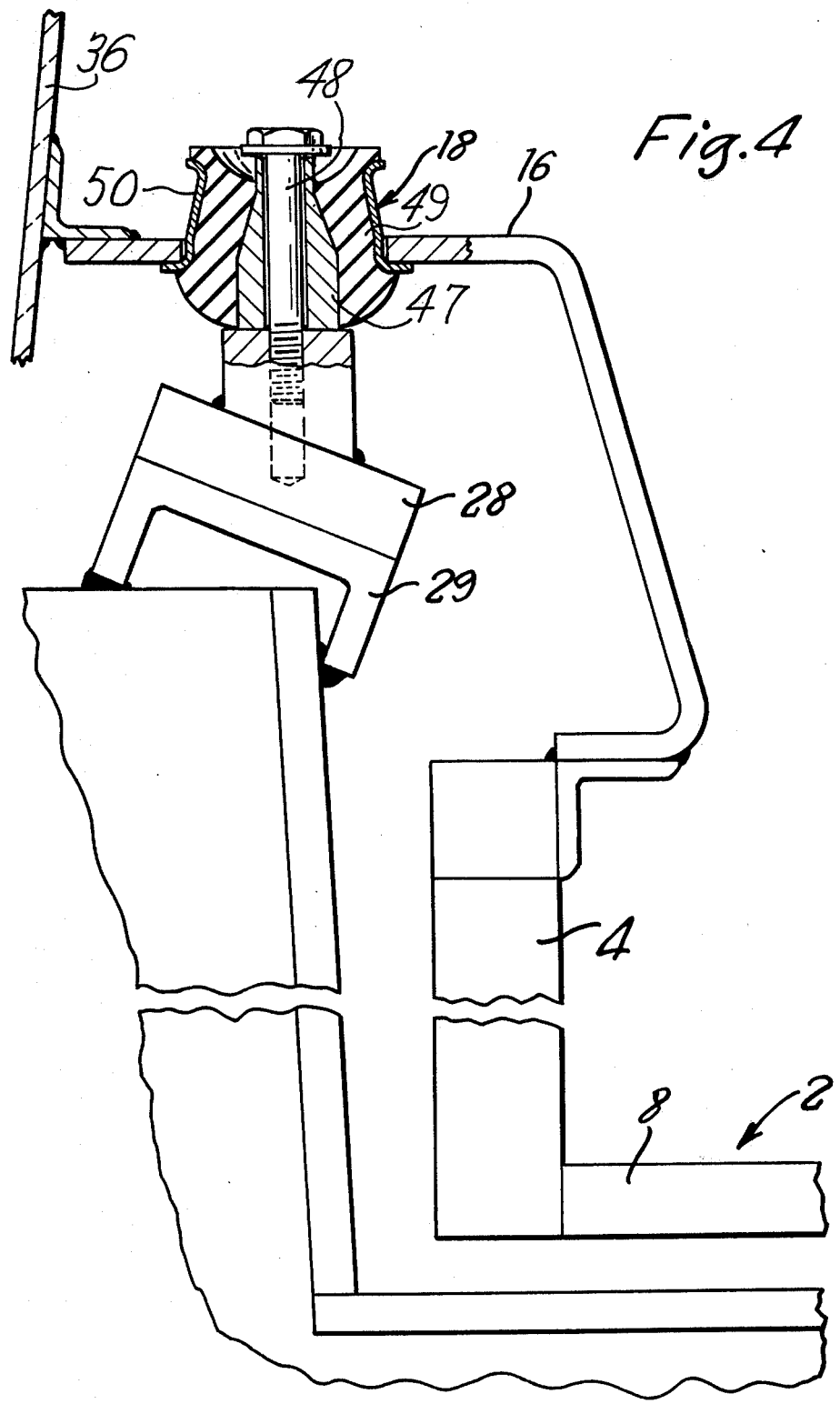
FIG. 4 is an enlarged side view, partly in section, illustrating the resilient mounting of the front part of the sub-frame to the support structure and the mounting of the cab to the sub-frame.

This reinforcing plate or bar is not shown in FIG. 4 because the bar need not extend the full length of the channel member 29. It may for example consist of two short pieces one located at each end of the channel member 29.

A cab of the invention may have a combined seat-supporting and controls embracing member comprising a one-piece plastics moulding shaped to provide a lower generally horizontal surface to support the operator's seat, and at least one higher surface situated to one side of the seat supporting surface and containing entry apertures for controls.

It will be appreciated that in the above described construction, the sub-frame 2, and in fact the entire cab, may effectively be a self-contained unit which is suspended on the four resilient mountings. This suspension system effectively insulates the cab from vibrations generated in the support structure 22 from both the engine 24 and from the ground over which the tractor is traveling.

It will also be appreciated that the tank 30 is a structural member because it supports the rear of the sub-frame 2, and the rear pair of members 43 of the "rollover protection structure" when fitted.

FIGS. 4 and 5 provide detailed cross-sections of the resilient mountings 18 and 20. Referring particularly to the mounting 18, this comprises an inner metal tube 47 located on a central clamping bolt 48 and a resilient upwardly converging sleeve 49 located between the inner metal tube and an outer metal casing 50 coupled to the bracket 16. The resilient sleeve 49 is usually made of rubber or a rubber mix designed to provide the appropriate stiffness for the vehicle cab mounting.

I claim:

1. A cab sub-frame for a vehicle having a support structure, the sub-frame comprising first and second pairs of longitudinally and laterally spaced apart upright beam elements having upper and lower ends, a pair of lower longitudinally extending beam elements adapted to carry a floor, the lower beam elements having opposite ends connected to the lower ends of the first and second pairs of upright beam elements, a pair of upper longitudinally extending beam elements adapted to carry on operator's seat, the upper beam elements having a first end connected to the upper ends of the second pair of upright beam elements and a second end extending longitudinally therefrom, a first crossbar extending between and connected at the opposite ends thereof to the upper ends of the first pair of upright beam elements, a second crossbar parallel to the first crossbar and extending between and connected at the opposite ends thereof to the extending second ends of the upper beam elements, first and second crossbar supports longitudinally spaced and mounted to the support structure, first and second resilient mountings respectively carried by the first and second crossbars, and connecting means for connecting the first and second resilient mountings carried by the first and second crossbars respectively to the first and second crossbar supports mounted on the support structure of the vehicle, the connection insulating the mounted sub-frame from vibration in the support structure.

2. A cab sub-frame as claimed in claim 1, wherein the combination further includes a cab having a superstructure carried by the sub-frame wherein the cab includes a roof, a windshield and doors.

3. A cab sub-frame as claimed in claim 1, further including a roll-over protection structure mounted to the first and second crossbar supports on the support structure.

4. A tractor vehicle cab sub-frame in combination with a vehicle support frame, comprising:
- a first pair of laterally spaced upright beams;
- a second pair of laterally spaced upright beams longitudinally spaced and parallel to the first pair of upright beams;
- a first pair of longitudinally extending beams connecting the lower ends of the first and second pairs of upright beams;
- a first crossbar connecting the upper ends of the first pair of upright beams and including first resilient pad means carried thereon for providing a first dampening barrier between the first crossbar and the support frame;
- a second crossbar spaced apart parallel to the first crossbar and including second resilient pad means carried thereon for providing a second dampening barrier between the second crossbar and the support frame;
- a second pair of longitudinally extending beams extending beyond the connection of the first pair of longitudinal beams to the lower ends of the second pair of upright beams and connecting the upper ends of the second pair of upright beams to the second crossbar and forming a seat support; and
- sub-frame support means mounted fore and aft on the support frame for connecting the first and second resilient pad means thereto.

5. The combination claimed in claim 4, wherein the sub-frame support means comprise a channel beam extending laterally and mounted on the forward end of the support frame, and a flat bar extending laterally and mounted on the rearward end of the support frame.

6. The combination claimed in claim 5, wherein the flat bar is mounted on the top of a combination fuel and hydraulic fluid tank.

7. The combination claimed in claim 5, wherein a hook-like member is connected to the first crossbar and carries the first resilient pad means and the channel beam is provided with means for mounting the first resilient pad means thereto.

8. The combination claimed in claim 1 wherein an operator's cab is mounted to the hook-like member.

9. The combination claimed in claim 7 further including a second hook-like member connected to the first crossbar, each hook-like member carrying the first resilient pad means, and the channel beam having means for mounting each first resilient pad means thereto.

10. The combination claimed in claim 5, further including a metal reinforcing plate connected to the channel beam to increase the thickness thereof; and an upright metal structural means mounted to the channel beam over the reinforcing plate and to the flat bar for providing a roll-over protection structure.

* * * * *